UNITED STATES PATENT OFFICE.

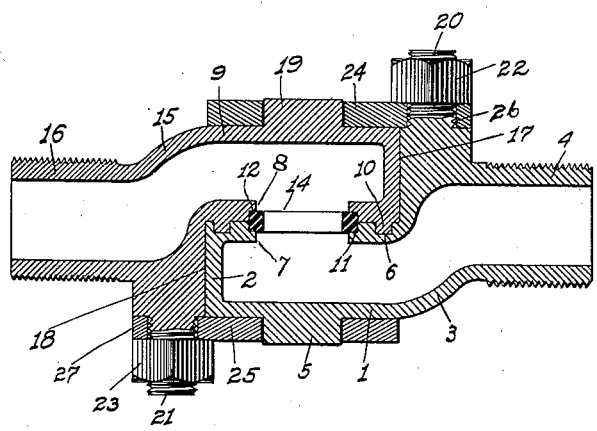

EDWARD J. CORBETT, OF SACRAMENTO, CALIFORNIA.

FLEXIBLE JOINT.

1,023,924.      Specification of Letters Patent.      Patented Apr. 23, 1912.

Application filed July 18, 1911. Serial No. 639,142.

*To all whom it may concern:*

Be it known that I, EDWARD J. CORBETT, a citizen of the United States, residing at Sacramento, in the county of Sacramento, State of California, have invented certain new and useful Improvements in Flexible Joints; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in joints for garden hose, steam pipe, air pipe or in fact any kind of pipe, the object of the invention being to produce a flexible joint whereby the same can be turned in the same plane with respect to its coöperating parts.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a sectional view of my improved joint. Fig. 2 is a top plan view of the same. Fig. 3 is a side elevation of a retaining washer.

Referring now more particularly to the characters of reference on the drawings, I first provide a hollow casing 1 having a closed end member 2 and an elbow 3 communicating with a tubular member 4 adapted to be connected with the hose or pipe, Said member 1 has a projecting circular lug 5 on its lower side for the purpose as will appear. Said member 1 is provided with an annular recess 6 in its upper side and has an opening 7 communicating through an opening 8 with another casing 9. Said casing 9 is similar in structure to the casing 1 but has an annular ring or flange 10 which fits into the recess 6 in a turnable manner, said member 1 having a recess 11 extending from the opening 7 and such member 9 having a recess 12 extending from the opening 8, there being washer 14 disposed within said recesses 11 and 12 respectively to make a water, air or steam tight joint between the said casings 1 and 9.

The casing 9 has an elbow 15 communicating with a tubular member 16 disposed in substantial alinement with the tubular member 4 in order to bring the respective hose or pipes connected with said members in substantial alinement. The member 1 has a shoulder 17 against which the closed end of the casing 9 abuts, and similarly the casing 9 has a shoulder 18 against which the closed end of the casing 1 abuts. The casing 9 is also provided on its upper end with a circular projecting lug 19 similar to the lug 5 on the casing 1. The shoulders 17 and 18 have projecting threaded pins 20 and 21 respectively on which are mounted nuts 22 and 23 respectively. These nuts hold in position washers 24 and 25 which fit over the lugs 19 and 5 respectively and have projecting flanges 26 and 27 which are centrally orificed to fit over the pins 20 and 21, and they each also have downwardly extending flanges 28 which fit over the shoulders 17 and 18 which prevents the said washers from turning. The said nuts fit against the members 26 and 27 to hold the washers in position.

In practice the casings 1 and 9 can turn one within the other by reason of the groove 6 and ring 10, and they are held closely together by means of the washers described and the securing means therefor, the pins 5 and 19 permitting the casings 1 and 9 to turn within said washer.

From the foregoing description it will be readily seen that I have produced such a device as substantially fulfils the objects of the invention as set forth herein, and also one which will be exceedingly effective for use on hydrants or the like.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A device of the character described comprising the combination of a first named casing and a second named casing, both of said casings being closed at one end, a shoulder on each of said casings against which the closed end of its adjacent casing abuts, a projecting threaded pin on each of said shoulders, a projecting circular lug on each of said casings, a washer disposed over each of said circular lugs, a flange on each washer, that flange on the washer disposed over the lug on one casing projecting over the threaded pin on the adjacent casing, a nut mounted on each of said threaded pins, each of said casings being provided with an orifice, said orifices communicating with each other, each of said casings being provided with a recess disposed within the line of the sides of orifices, a flexible washer disposed in said recesses, one of said casings being provided with an annular groove in its side, and an annular flange on the other of said casings, said flange being disposed in said annular groove as described.

In testimony whereof I affix my signature in presence of two witnesses.

EDWARD J. CORBETT.

Witnesses:
STEPHEN N. BLEWETT,
JOSHUA B. WEBSTER.

Copies of this patent may be obtained for five cents each, by addressing the "Commissioner of Patents, Washington, D. C."